United States Patent Office 3,792,083
Patented Feb. 12, 1974

3,792,083
MIXED TEREPHTHALIC AND ISOPHTHALIC ACID SALTS OF DODECAMETHYLENE DIAMINE
Alfred Steitz, Jr., Batavia, Ill., assignor to Standard Oil Company, Chicago, Ill.
No Drawing. Filed Oct. 20, 1970, Ser. No. 82,523
Int. Cl. C07c *87/14*
U.S. Cl. 260—501.2                                   1 Claim

ABSTRACT OF THE DISCLOSURE

Novel mixed dodecamethylene diammonium salt solutions and a process for their preparation are disclosed. These solutions are prepared by reacting 1,12-diamino-dodecane with terephthalic acid, and isophthalic acid, hexahydroterephthalic acid or 5-tertiary-butylisophthalic acid. These mixed dodecamethylene diammonium salt solutions are useful for the preparation of polydodecamethylene terephthalamide copolymers and fibers. These fibers, when woven into fabric, have improved aesthetic and wash-wear properties.

---

The novel mixed dodecamethyl diammonium salts of terephthalic acid and modifying acids such as isophthalic acid, hexahydroterephthalic acid and 5-tertiary-butylisophthalic acid were prepared by reacting these acids with 1,12-diaminododecane in an aqueous medium. This novel process involves combining two pure C–12 diamino salts, one water soluble and the other water insoluble, in the presence of water and raising the temperature of the solution until both salts are in solution and a homogeneous mixture of mixed salts is obtained. According to this process a homogeneous solution of controlled composition can be obtained from the C–12 amine salts of widely different solubility characteristics.

Polyamides are manufactured by heating equivalent amounts of a diamine and a dicarboxylic acid in the form of the diammonium salt, or "nylon salt," in a 50 to 60% aqueous solution. The water is necessary to moderate the reaction by mass effect on the equilibrium and it facilitates good heat transfer to reactants. However, it is necessary that the nylon salt be soluble in the water before polymerization starts or a non-homogeneous polymer results. The preparation of high concentrations of nylon 6–6 salt solution presents no unusual difficulties because of its high solubility in water at room temperature. It is particularly difficult to obtain such a homogeneous solution when the nylon salts are of low solubility in water, or when mixed salts are used which are of different solubility. We have found that although the solubility of dodecamethylene diammonium terephthalate is quite low below 100° C. it possesses unusually high solubility in water above 100° C.

For the preparation of copolyamides it is necessary to react mixed nylon salts. However, preparation of mixed nylon salts presents difficulty when the two salts have different solubilities. For example, the dodecamethylene diammonium salt of isophthalic acid, hexahydroterephthalic acid, or 5-tertiary-butylisophthalic acid are quite soluble in water at room temperature. When mixed salts of dodecamethylene diammonium terephthalate and the diammonium salt of one of these other acids which produce soluble nylon salts are prepared together and purified only the terephthalic acid salt is recovered by crystallization and the more soluble salt is lost to the filtrate. The solubility data of individual nylon salts is shown in Table I.

TABLE I
[Solubility of dodecamethylene diammonium salt in water]

| Salt | Temperature, °C. | Wt. percent |
|---|---|---|
| Dodecamethylene diammonium terephthalate | 27 | 1.0 |
|  | 93 | 5.0 |
|  | 100 | 7.0 |
|  | 109 | 10.0 |
|  | 125 | 25.0 |
|  | 152 | 50.0 |
| Dodecamethylene diammonium terephthalate (90%) Dodecamethylene diammonium isophthalate (10%) | 145 | 50.0 |
| Dodecamethylene diammonium hexahydroterephthalate | 27 | 50.0 |
| odecamethylene diammonium isophthalate | 27 | ca. 50 |

In the suitable embodiment of this invention dodecamethylene diammonium terephthalate is first prepared by reacting 1,12-diamino-dodecane with therephthalic acid in the presence of a sufficient amount of water to dissolve the salt at 90 to 150° C. The solution is treated with carbon, cooled, the purified salt crystallized from solution, filtered, and dried. In a similar manner the C–12 diamine salt of the modifying acid is made in the quantity of water used for a polymerization run but is not recovered by crystallization. Thus, an aqueous solution of the C–12 diamino salt of isophthalic acid, hexahydroterephthalic acid or 5-tertiary-butylisophthalic acid is prepared. The ratio of the modifying acid salt to the dodecamethylene diammonium salt of terephthalic acid is about 5 to 25 mol percent. Pure, solid dodecamethylene diammonium terephthalate is then added to the solution of modifying acid salt at room temperature and the slurry heated under pressure to about 140 to 160° C. to form a homogeneous mixture of salts. This solution of the mixed salts is ready for polymerization to produce a high molecular weight copolymer of 1,12-diaminododecane. Such copolyamides may be melt spun to produce fibers which when woven into fabric have a pleasant silk-like appearance and hand. These polymers also have a high glass transition point and a high modulus and are useful in the preparation of fabric for good wash and wear applications. Further details for the preparation of the poly(dodecamethylene terephthalamide-dodecamethylene isophthalamide) and related copolymers and fibers thereof are disclosed in the co-pending application by the same inventor entitled Product and Process filed on the same date as this application and carrying attorney docket numbers of F–425(C) and F–434(C).

An additional unexpected feature of the novel C–12 salts and the process for preparing them resides in the fact that the unexpected solubility of the terephthalic acid salt at temperatures about 100° C. facilitate the salt mixture becoming homogeneous a temperatures just below the point that prepolymerization begins thus insuring the production of a uniform copolymer of controlled composition and structure. Advantageously, the process for the preparation of homogeneous solutions of mixed diammonium salts of 1,12-diaminododecane and terephthalic acid and a modifying acid selected from the group consisting of isophthalic acid, hexahydroterephthalic acid and 5-tertiary-butyl-isophthalic acid comprises heating of an aqueous or water slurry of the diammonium salts of 1,12-diaminododecane and terephthalic acid and one of the modifying acids to a temperature of about 140 to 160° C. without polymerization taking place to produce a homogeneous mixture of about 50 to 60 weight percent of the mixed salts which are further capable of forming fiber-forming polyamide polymers.

In this process 1,12-diaminododecane salt of terephthalic acid and isophthalic acid or hexahydroterephthalic acid are heated to a temperature of about 140 to 160° C. without polymerization to produce a homogeneous mixture of 75 to 95 mol percent of dodecamethylene diammonium terephthalate and 25 to 5 mol percent dodecamethylene diammonium isophthalate or dodecamethylene diammonium hexahydroterephthalate.

In a preferred embodiment the mixed salt is prepared by dissolving 88 to 92 parts by weight dodecamethylene diammonium salt of terephthalic acid prepared as shown in Example I in a solution of 12 to 8 parts of dodecamethylene diammonium isophthalate or salts of any of the other modifying acids, for example, hexahydroterephthalic acid. This mixed dodecamethyl diammonium salt slurry is then heated to about 140 to 160° C. at which temperature the salt slurry becomes homogeneous. This solution contains 75 to 95 mol percent dodecamethylene diammonium salt of terephthalic acid and 25 to 5 mol percent of dodecamethyl diammonium salt of isophthalic acid, hexahydroterephthalic acid or the 5-tertiary-butyl-isophthalic acid.

This solution then can be used to prepare the following copolymers: poly(dodecamethylene terephthalamide-dodecamethylene isophthalamide), poly(dodecamethylene terephthalamide-dodecamethylene hexahydroterephthalamide), poly(dodecamethylene terephthalamide-dodecamethylene t-butylisophthalamide).

In an advantageous embodiment for the polymerization, 90 parts by weight of the dodecamethylene diammonium salts of terephthalic acid are added to 200 parts by weight of an aqueous solution containing 10 parts by weight of the dodecamethylene diammonium salt of isophthalic acid. This solution is heated up to about 230° C. for over a period of one hour, then prepolymerized at a temperature of about 230° C. for about 60 to 75 minutes while removing the water, and polycondensed at a temperature of about 310 to 320° C. for about 30 to 60 minutes. The product had a good appearance and had an inherent viscosity of between 0.70 and 0.90. It had a glass transition temperature of about 175 to 185° C. and a crystalline melting point of 280 to 288° C.

The invention is further exemplified in the following examples:

EXAMPLE I

Dodecamethylene diammonium salt of terephthalic acid was prepared as follows: To 4000 ml. of water at 85° C. in a five-liter flask was added 136.5 grams (0.822 mol) of terephthalic acid. To the slurry then were added 173 grams (0.865 mol, a 5% excess) of 1,12-diaminododecane. The mixture was refluxed, at which time all materials went into solution (7 wt. percent solution of salt). Fifteen grams of charcoal (Nuchar C–190, 5 wt. percent) was added and refluxing continued for 30 minutes. The solution was filtered hot to remove the charcoal. The filtrate was cooled in ice and then filtered to remove the crystals of the dodecamethylene diammonium salt of terephthalic acid. The melting point of the salt was 265° C.

EXAMPLE II

Filtrate from Example I was made up to 4000 ml. with water. To the solution at 85° C. in a five-liter flask was added 136.5 grams (0.822 mol) of terephthalic acid. To the slurry then were added 173 grams (0.865 mol, a 5% excess) of $C_{12}$–diamine. After solution has been attained, 15 grams (5 wt. percent) of Nuchar C–190 (30 mesh) carbon was added and the solution was refluxed 30 minutes. The solution was filtered hot to remove carbon (it is convenient to divide the solution into two batches to prevent excessive chilling during filtration). The filtered solutions were chilled to give higher precipitation yields. The salt was filtered and washed with acetone to remove any excess amine. The acetone was discarded. The aqueous filtrate was saved for preparation of a new batch. Salt recovery was 280 grams giving a yield of 90.5%.

EXAMPLE III

To 600 ml. of water was added 31.3 grams (0.189 mol) of isophthalic acid and 32.8 grams (0.164 mol) of 1,12-diaminododecane. The isophthalic acid was in 1.5 mol percent excess of total acid in the polymer so as to stabilize the viscosity of the finished polymer. Three grams of decolorizing carbon was added. The mixture was refluxed for one-half hour and filtered.

The solution of dodecamethylene diammonium salt of isophthalic acid was then added to an autoclave along with 540 grams (1.48 mols) of the dodecamethylene diammonium salt of terephthalic acid.

The slurry of the dodecamethylene diammonium salt of the terephthalic acid in a solution of the dodecamethylene diammonium salt of isophthalic acid and stabilizer, isophthalic acid, was heated under an inert nitrogen blanket in a closed autoclave until the dodecamethylene diammonium salt of terephthalic acid went into solution. This was indicated by the thermocouples in the autoclave jacket and the internal contents assuming identical readings and this occurred at about 150° C. At this point a homogeneous solution of mixed nylon salts exists.

EXAMPLE IV

To 1000 parts by weight of the dodecamethylene diammonium salt of isophthalic acid prepared above were added 900 parts by weight of the dodecamethylene diammonium salt of terephthalic acid prepared as shown in Example I, and .05 part by weight manganese hypophosphite and a drop of silicone oil. The heat-up time to 230° C. in the closed reactor took 60 minutes, the prepolymerization and water removal at 230° C. took 75 minutes, the reactor temperature was increased to 310° C. in 15 minutes and to further enhance the polycondensation the reactor temperature was maintained at 310 to 320° C. for 60 minutes at atmospheric pressure. The polymer was extruded from the bottom of the reactor with nitrogen pressure.

EXAMPLE V

Dodecamethylene diammonium hexahydroterephthalate was prepared by adding 172 parts by weight of hexahydroterephthalic acid and 210 parts of 1,12-diaminododecane to boiling water (250 parts). The mixture was refluxed 30 minutes with 19 grams of activated carbon, filtered hot, then chilled with ice. Crystals of the dodecamethylene diammonium salt were obtained which melted between 175 to 180° C.

The following slurry was then charged to an autoclave:

540 grams dodecamethylene diammonium terephthalate
60 grams dodecamethylene diammonium hexahydroterephthalate
4.2 grams hexahydroterephthalic acid
600 ml. water The autoclave was sealed and purged with nitrogen. On heating the autoclave up with slow stirring of contents the jacket and interval temperatures came together at 157° C. indicating that the reactor contents had become homogeneous at a solution concentration of 50 weight percent salt. The heating cycles for polymerization are indicated in Example IV. At the termination of the polymerization step, poly(dodecamethylene terephthalamide-dodecamethylene hexahydroterephthalamide) copolymer was extruded from the reactor. This copolymer is a polymer of poly(dodecamethylene terephthalamide) modified with 10 weight percent hexahydroterephthalamide. The modified polyamide had an inherent viscosity of 0.84 and crystalline melting points 282 and 289° C. The molded sample had an unusually high heat distortion temperature of 272° F. at 264 p.s.i.

Certain variations in preparation procedures could conveniently be employed and still fall within the scope of the invention. For example, the 1,12-diaminododecane salt of terephthalic acid could be prepared under autogeneous pressure at temperatures up to about 150° C. in concentration above 7 weight percent as taught in the above example at 100° C. The salt of the modifying acid can be prepared in solution as taught above in Example II or isolated from solution as taught in Example III, or both salts can be prepared at elevated temperatures simultaneously, in which case they cannot be isolated but must be used in the ratio in which they are prepared to insure control of the ratio of salts.

I claim:

1. A homogeneous solution of a mixed diammonium salt in a water medium wherein said salt consists of 75 to 95 mole percent of dodecamethylene diammonium terephthalate and correspondingly 25 to 5 mole percent of dodecamethylene diammonium isophthalate, the concentration of said mixed diammonium salt being 50 to 60 weight percent.

References Cited
UNITED STATES PATENTS

| | | | |
|---|---|---|---|
| 2,130,947 | 9/1938 | Carothers | 260—501 |
| 2,742,496 | 4/1956 | Lum et al. | 260—501 |

FOREIGN PATENTS

| | | | |
|---|---|---|---|
| 1,416,844 | 9/1965 | France | 260—501 |

LEON ZITVER, Primary Examiner

M. W. GLYNN, Assistant Examiner

U.S. Cl. X.R.

260—78 R

UNITED STATES PATENT OFFICE
CERTIFICATE OF CORRECTION

Patent No. 3,792,083          Dated February 12, 1974

Inventor(s) Alfred Steitz, Jr.

It is certified that error appears in the above-identified patent and that said Letters Patent are hereby corrected as shown below:

Column 2, line 14, Table I - "odecamethylene" should read -- Dodecamethylene --; Table I line 30, "ca. 50" should read -- about 50. --; Column 2, line 53, "a" should read -- at --.

Signed and sealed this 24th day of September 1974.

(SEAL)
Attest:

McCOY M. GIBSON JR.
Attesting Officer

C. MARSHALL DANN
Commissioner of Patents